United States Patent [19]

Tauer

[11] Patent Number: 5,178,508

[45] Date of Patent: Jan. 12, 1993

[54] BOWL-LIFTING APPARATUS

[76] Inventor: Roland J. Tauer, 2731 Hayes St. NE., Minneapolis, Minn. 55418

[21] Appl. No.: 788,137

[22] Filed: Nov. 5, 1991

[51] Int. Cl.⁵ ........................................... B65G 63/24
[52] U.S. Cl. .................... 414/420; 248/129; 248/140; 414/683
[58] Field of Search ............... 414/680, 683, 589, 590, 414/419, 420, 421, 742; 298/1 R, 1 C, 2, 17 R; 222/604, 164, 165, ; 248/129, 137, 140, 141

[56] References Cited

U.S. PATENT DOCUMENTS

| | | | |
|---|---|---|---|
| 1,589,529 | 6/1926 | Holland | 414/683 |
| 4,213,727 | 7/1980 | Lighthipe, Jr. | 414/420 |
| 4,749,324 | 6/1988 | Rulison | 414/680 X |

FOREIGN PATENT DOCUMENTS 1024416  6/1983  U.S.S.R. ............... 414/419

OTHER PUBLICATIONS

Brochure of Savage Bros. Co. on Bowl Lifting Device.

*Primary Examiner*—Michael S. Huppert
*Assistant Examiner*—Donald W. Underwood
*Attorney, Agent, or Firm*—Jacobson & Johnson

[57] ABSTRACT

A bowl-lifting apparatus having a linear actuator to rotate a pivotal Y-shaped bowl lift arm with the bowl-lifting apparatus having self locking members to automatically lock the mixing bowl in the bowl-lifting apparatus to permit a person to move the mixing bowl about. A shock absorber or bowl damper prevents undue oscillation of the mixing bowl as the mixing bowl is emptied. A lever allows the user to quickly tip the mixing bowl and empty the contents of the mixing bowl into another container. A twelve volt battery and a charger mounted on the bowl lifting apparatus provide a mobile power source that can be recharged overnight. A four bar linkage with a sensor switch prevents the bowl-lifting apparatus from lifting a bowl if the bowl is improperly aligned on the lift arms.

10 Claims, 4 Drawing Sheets

BOWL-LIFTING APPARATUS

FIELD OF THE INVENTION

This invention generally relates to a bowl-lifting apparatus and, more specifically, to a bowl-lifting apparatus for safely lifting, moving, and emptying large mixing bowls.

BACKGROUND OF THE INVENTION

The concept of devices for lifting heavy metal mixing bowls is old in the art. Typically, a mixing bowl may weigh in excess of 70 pounds and the mixing bowl with its contents may weight in excess of 400 pounds. Since the mixing bowls and their contents usually need to be moved from a mixing area to a baking area it is necessary to have some type of device to move the heavy mixing bowl and its contents. Prior art bowl-lifting devices generally consist of some type of a vertical shaft that has a cantilevered bowl-lifting arm extending perpendicular outward from the vertical shaft. Typically, either a hydraulic cylinder or a power driven screw drive lifts the mixing bowl to the proper height. Once elevated, the bowl can be moved to a second location and then tilted to empty its contents. The present invention comprises an improvement to the prior art bowl-lifting devices by providing a portable, lightweight, inexpensive bowl-lifting device which quickly lifts the bowl while at the same time automatically locks the bowl into the bowl-lifting device to prevent the mixing bowl and its contents from falling off the bowl-lifting device. Once the bowl-lifting device lifts the mixing bowl off the floor or a dolly the user can wheel the mixing bowl with its contents to a new location where the contents of the mixing bowl are emptied. To insure that the heavy mixing bowl does not swing dangerously back and forth in the bowl-lifting device the present invention includes a bowl damper or shock absorber to dampen oscillations of the mixing bowl and thus minimize chances of injury to a person who may accidently come in contact with the heavy mixing bowl. The bowl-lifting apparatus also includes a lever for a user to quickly empty the contents of the mixing bowl into another container. Also should the mixing bowl not be properly orientated on the bowl-lifting arms a safety switch prevents the operator from raising the mixing bowl and its contents.

BRIEF SUMMARY OF THE INVENTION

Briefly, the present invention comprises a self powered bowl-lifting apparatus having a pivotal lift arm that can be raised and lowered by a linear actuator. The pivotal lift arm includes a shock absorber to dampen oscillations of the mixing bowl as the mixing bowl and its contents are lifted and a lever for tilting the mixing bowl so that the contents of the mixing bowl can be quickly emptied. Pivotal self locking latches automatically engage the lifting ears of the mixing bowl to prevent the mixing bowl from falling off the lifting arm during movement of the lift arm. A twelve volt battery provides power for lifting the mixing bowl and a charger mounted on the bowl-lifting apparatus permits a user to recharge the battery.

DESCRIPTION OF THE PREFERRED EMBODIMENT

Figure 1:
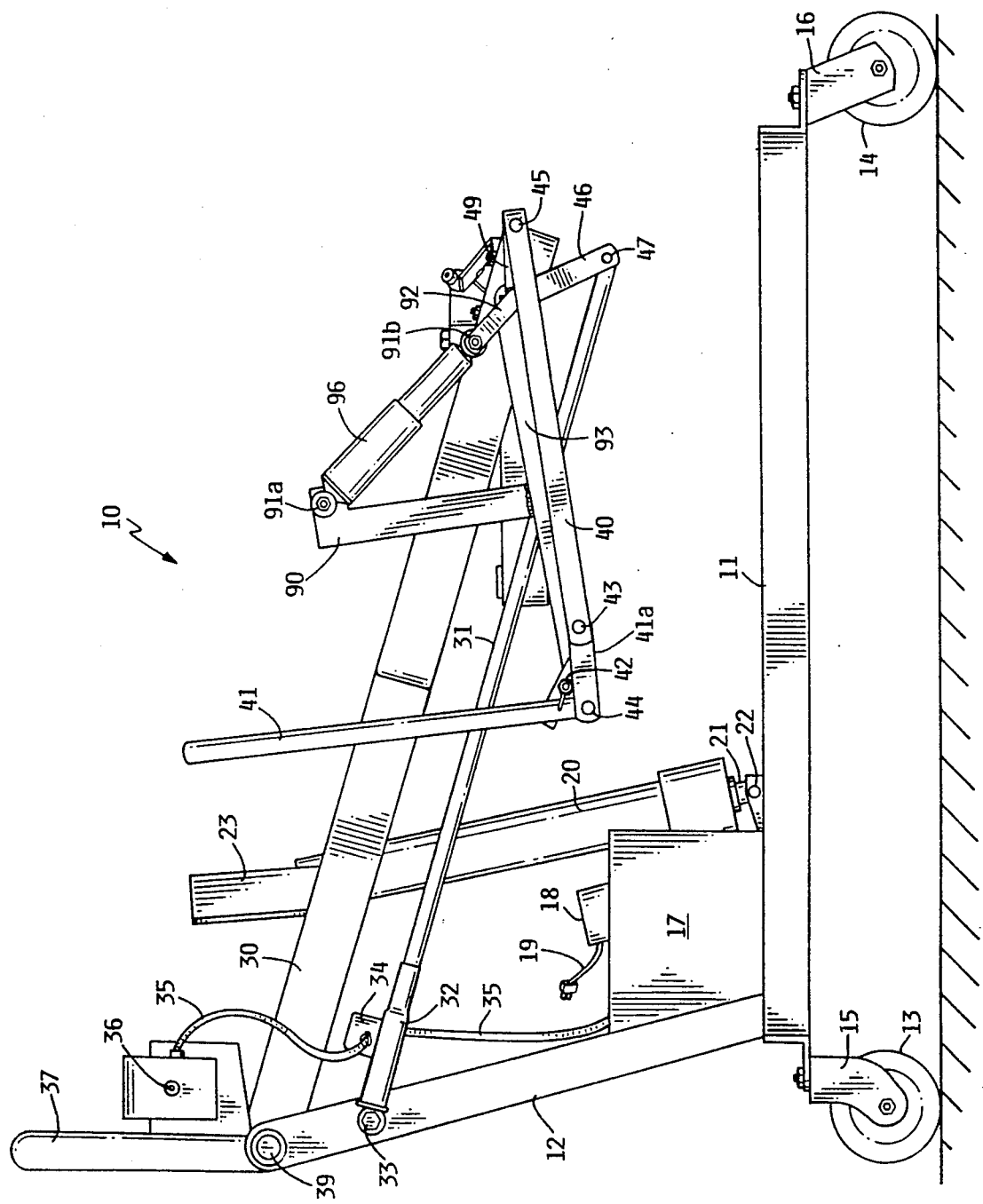
FIG. 1 is a side elevation view of the present invention.
Figure 3:
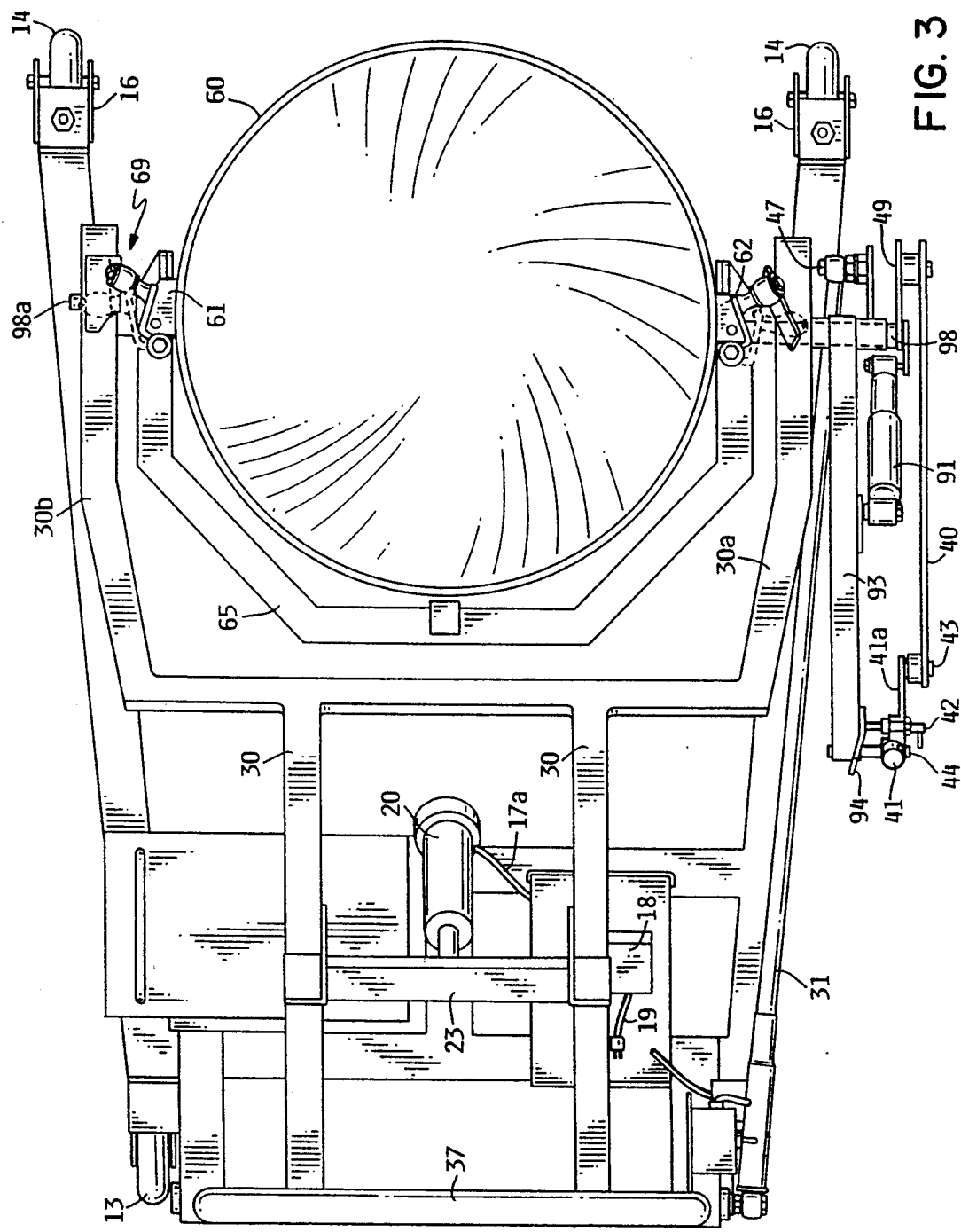
FIG. 3 is a top view of the lifting device with a mixing bowl located therein.

Referring to FIG. 1 and FIG. 3, reference numeral 10, generally identifies my bowl-lifting apparatus comprising a main frame having a horizontal member 11 and a second member 12 extending obliquely from horizontal number 11. A pair of roller wheels 13 located in pivotable housings 15 support one end of bowl-lifting apparatus 10. Similarly, a pair of roller wheels 14 located in housings 16 support the other end of bowl-lifting apparatus 10. A handle 37 allows a user to push bowl-lifting apparatus about on wheels 13 and 14.

The bowl-lifting apparatus 10 comprises a main frame for pivotal supporting a lift arm, a power source, a pivotable lift arm, a bowl damper, a self-locking mechanism for locking a mixing bowl into the bowl-lifting apparatus and a lever mechanism for quickly emptying the contents of the mixing bowl.

The power source for the present invention comprises a twelve volt battery 17. Permanently mounted to bowl-lifting apparatus 10 is a battery charger 18 having a power cord 19 connected thereto for charging the battery. Battery 17 connects to and powers a linear actuator 20 through electrical cord 17a. Linear actuator 20 has one end pivotally connected to mainframe 11 through a pivot pin 22 and an extension member 21. Similarly the opposite end of linear actuator 20 is pivotally attached to cross arm 23. A switch 36 allows the user to extend or contract a rod in linear actuator 20 by controlling the power from battery 17.

Linear actuators are known in the art and will not be described herein. Generally linear actuators comprise a rotatable member which extends or contracts a rod from the end of the actuator as power is applied to the linear actuator.

Figure 2:
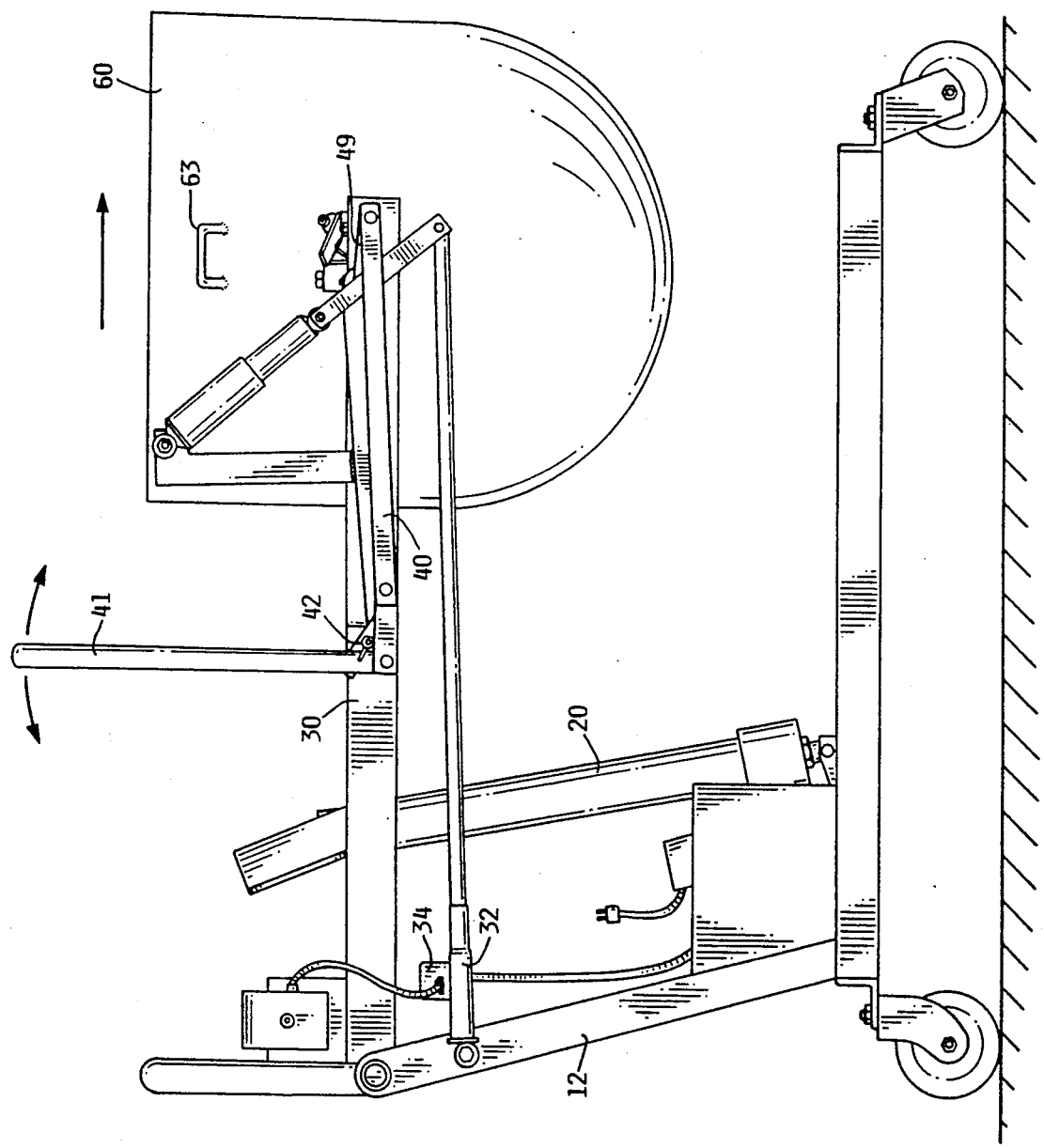
FIG. 2 is a side elevation view of the present invention lifting a mixing bowl.

Connected to the top portion of frame member 12 is a Y-shaped bowl lift arm 30 which is pivotally supported on frame member 12 by a pivot pin 39. Lift arm 30 can be raised and lowered through the powering of linear actuator 20. FIG. 1 illustrates the bowl lift arm 30 in the lowered position, and FIG. 2 illustrates the bowl lift arm 30 in a semi-raised position. That is, extending linear actuator 20 forces bowl lift arm to pivot counter clockwise about pivot pin 39 thereby elevating bowl lift arm members 30a and 30b.

Pivotally connected to frame member 12 through pivot pint 33 is one end of a four bar linkage. The four bar linkage includes a link member 31 with one end of link member 31 pivotally connects to member 46 through a pivot pin 47. The other end pivotally connects to member 12 through pivot pin 33. Member 46 fixedly connects to a cylindrical lateral pivot pin 98 (FIG. 3) extending outward from one side of U shaped bowl support 65. Lateral pivot pin 98 extends outward from bowl support 65 and is pivotal supported in arm 30a. Similarly a second lateral pivot pin 98a extends outward from bowl support 65 and is pivotal supported in arm 30b. Pivot pins 98a and 98 provide the pivotally connection between lift arms 30a and 30b to allow a mixing bowl located in the lift arms to maintain its vertical orientation as the user lifts the mixing bowl. That is, the mixing bowl which is identified by reference numeral 60 in FIG. 2 generally has a hemispherical bottom with a cylindrical top portion. A pair of handles 63 extend from each side of the mixing bowl to allow a person to grip the mixing bowl. Extending laterally outward from mixing bowl 60 are ears 61 and 62 (FIG. 3) which are located above the center of gravity of mixing bowl 60. Consequently, if lifted by the ears 61 and 62 the mixing bowl 60 automatically seeks the vertical arrangement shown in FIG. 2 since the weight of the mixing bowl and any contents in the mixing bowl force the mixing bowl to hang vertically.

Since an empty mixing bowl may weight 70 lbs or more and a loaded mixing bowl may weight over 400 pounds it is necessary that care is used in raising and lowering the mixing bowl since the momentum generated by a swinging mixing bowl is substantial and could injure someone. A safety feature of the present invention is the four bar linkage and a sensor that prevents the user from lifting the mixing bowl if conditions are not proper for lifting.

Located on one end of member 31 of the four bar linkage is a compressible section 32 which contains a switch 34 and a spring (not shown). If there is a tension stress on member 31 due to the misalignment of the mixing bowl or to the oscillation of the mixing bowl the switch 34 opens circuit 35 to prevent an operator from powering actuator with switch 36. The link member 31, the frame member 12, the arm 46, and lift arm 30 comprise a four bar linkage with pivot pin 98 connected to arm 46. Consequently, should there be an swaying, rocking or misalignment of mixing bowl 60 the bowl will not remain vertical and it will produce a compressive or tension force on link member 31. A compressive or tension force on link member 31 opens switch 34 thus preventing the user from lifting mixing bowl 60. That is, switch 34 connects to circuit 35 that supplies power to switch 36 for raising and lowering mixing bowl 60 to act as a safety switch to prevent one from raising mixing bowl 60 if the ears are not properly aligned with the lifting members or if mixing bowl 60 is swaying excessively.

My invention also includes means for quickly emptying the contents of a mixing bowl. The means comprises a lever arm 41 which is pivotally connected to member 93 through a pin 44. One end of a link 41a connect to link 40 through pivot pin 43. Link 40 connects to member 49 through a pivot link 45.

FIG. 3, numeral 98, identifies one of the laterally extending pivot pins which extends through arm 30a and a similar one extends through arm 30b. The pivot pins 98 and 98a support frame member 65 in a pivoting relationship to arms 30a and 30b. Note laterally extending pivot pin 98 connects to member 49; however, pin 98 is pivotable with respect to member 30a to allow lift arm 30 to be raised from the lower position as shown in FIG. 1 to the upper position shown in FIG. 2, while allowing mixing bowl 60 to maintain its vertical orientation. Pivot pin 98a on the opposite side is not connected to any linkage or lever mechanism but pivot pin 98a also allows lift arm 30 to be raised from the lower position as shown in FIG. 1 to the upper position shown in FIG. 2, while allowing mixing bowl 60 to maintain its vertical orientation.

Figure 4:
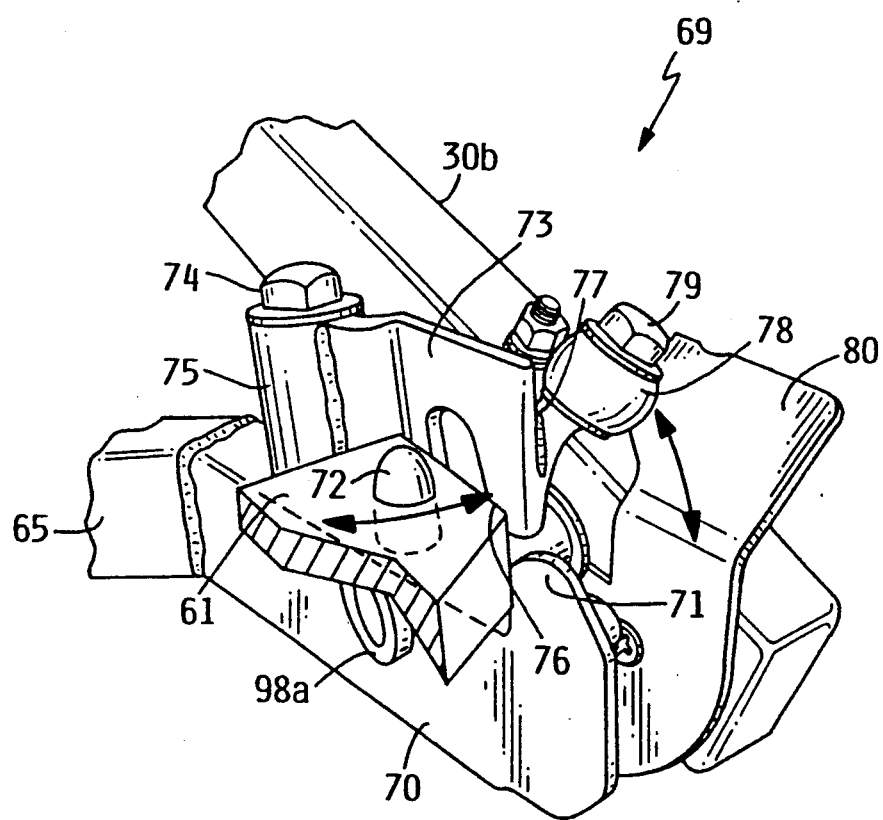
FIG. 4 is a detail pictorial view of the self-locking mechanism for automatically locking the ears of the mixing bowl into the bowl-lifting apparatus.

Located on each side of mixing bowl 60 are self locking bowl mechanisms 69. FIG. 4 shows the detail of self-locking mechanism 69 in greater detail. Since the self locking mechanisms are mirror images of each other only one will be described. Self-locking mechanism 69 includes a pivotal self locking latch 73 which is pivotally supported by a bolt 74 extending through housing 75. Connected to the back side of pivotal self locking latch 73 is a member 77 which contains a spherical cam follower 78 which is rotatably held in position by bolt 79. An angled flat cam plate 80 attaches to arm 30b and is rigidly mounted thereto. The portion of the ear of mixing bowl 60 is designated by reference numeral 61 and a conical tipped locating pin 72 on arm 65 extends upward through an opening in ear 61. Similarly, a guide stop 71 extends in front of ear 61 to coact with pin 72 to hold hold ear 61 in horizontal position on arm 65. Pivotal self locking latch 73 is shown located in the rear position and out of the way so that the ear 61 of the mixing bowl 60 can be placed vertically on pin 72

The automatic self locking feature of pivotal self locking latch 73 will now be described. As arm 30b is raised upward (counter clockwise rotation), cam plate 80 moves counter clockwise with relation to cam follower 78 since the weight of mixing mixing bowl 60 causes the mixing mixing bowl to hang vertically while lift arm 30b is raised. Consequently as cam follower 78 engages cam plate 80 it forces pivotal self locking latch 73 forward (direction of the arrow) over the top of ear 61. With pivotal self locking latch 73 located over ear 61 and pin 72 extending through ear 61 they combine to prevent either horizontal or vertical movement of ear 61. Thus, ear 61 and mixing bowl 60 are automatically locked in the lift arm 30 as one lifts mixing bowl 60.

The self locking mechanism located on the opposite side of mixing bowl 69 is identical and will not be described in detail, except to point out that the two self locking mechanism work in conjunction so that both ears of the mixing bowl are held securely in the lift arm. Once mixing bowl 60 is lifted and moved to a new location, the person may wish to empty the contents of mixing bowl 60. To do so, the operator first pulls out on a spring loaded pin 42 to disengage lever 41 (FIG. 3) from plate 94 located on member 93. With pin 42 disengaged the operator can then rotate lever 41 counter-clockwise which in turn pulls on link 40 which engages member 49 to provide a counter-clockwise rotational force to mixing bowl 60 through lateral extending pivot pin 98. FIG. 2 illustrates mixing bowl 60 in the elevated position and, in this position, a clockwise thrust on member 41 provides a rearward thrust on link 40 which, in turn, provides a clockwise rotational force on member 49 and pin 98 to allow the user to tilt mixing bowl 60 in order to quickly empty the contents of mixing bowl 10.

Also connected to the unit is bowl damper which comprises a shock absorber 91 which is connected on one end to lateral extending pivot pin 98 through members 92. The opposite end of shock absorber 91 connects to member 93 through member 90. One end of shock absorber include a pivotal connection 91a and the opposite end includes a similar pivotal connection 91b. The purpose of the shock absorber is to quickly damp out undue oscillations of mixing bowl 60. That is, one can force the mixing bowl over to dump the contents, but the shock absorber prevents rapid oscillation once the mixing bowl is emptied or partialy emptied.

I claim:

1. A bowl-handling apparatus for lifting, transporting, and emptying the contents of a mixing bowl comprising:

a frame;

a lift arm having a first end and a second end, said first end pivotally connected to said frame, said first end of said lift arm including a first cam follower;

said second end pivotally connected to said frame, said second end including a second cam follower;

a linear actuator connected to said frame and said lift arm for pivoting said lift arm to thereby raise said first end and said second end of said lift arm;

a U-shaped bowl holder, said U-shaped bowl holder having a first conically tipped guide pin for engaging a first ear of a mixing bowl and a second conically tipped guide pin for engaging a second ear of the mixing bowl to align and hold said mixing bowl on said U-shaped bowl holder, said U-shaped bowl holder having a first lateral extending pivot pin for pivotally engaging said said first end of said lift arm and a second lateral extending pivot pin for pivotally engaging said second end of said lift arm to permit said U-shaped bowl holder to pivot with respect to said lift arm as said lift arm is raised or lowered;

a first pivotal self locking latch mechanism located on said U-shaped bowl holder, to secure a first ear of the mixing bowl to said U-shaped bowl holder, said first pivotal self locking latch mechanism including a first pivotal latch with a first cam for engaging said first cam follower so that when said lift arm is pivoted upward said first cam engages said first cam follower to force said first pivotal self locking latch over the first ear on the mixing bowl located on said U-shaped bowl holder so that the first ear of mixing bowl can be locked in said U-shaped bowl holder;

a second pivotal self locking latch mechanism located on said U-shaped bowl holder to secure a second ear of the mixing bowl to said U-shaped bowl holder, said second pivotal self locking latch mechanism including a second pivotal latch with a second cam for engaging said second cam follower so that when said lift arm is pivoted upward said second cam engages said second cam follower to force said second pivotal self locking latch over the second ear on the mixing bowl located on said U-shaped bowl holder so that the second ear of the mixing bowl can be locked in said U-shaped bowl holder;

a shock absorber connected to a first linkage and to said U-shaped bowl holder to dampen rocking motion of a mixing bowl as a mixing bowl is lifted upward in said frame;

lever arm connected to said first linkage which is connected to said first lateral extending pivot pin, said lever arm pivotally connected to a second linkage which is connected to said laterally extended pivot pin to permit a user to move said lever arm to rotate said first lateral pivot pin and said U-shaped bowl holder with respect to said frame to enable a user to empty the contents of the mixing bowl supported in said U-shaped bowl holder; and a locking mechanism to lock said lever arm to said first linkage when said lever arm is not in use so that said said U-shaped bowl holder does not accidently tip.

2. The bowl-handling apparatus of claim 1 including a battery for powering said linear actuator.

3. The bowl-handling apparatus of claim 2 including a charger for charging said battery.

4. The bowl-handling apparatus of claim 1 including wheels on said frame to permit a user to wheel said bowl-handling apparatus from place to place.

5. The bowl-handling apparatus of claim 1 including a compressible link connected to first pivot pin and said frame, said compressible link including a safety switch for deactivating the power of said bowl-handling apparatus to prevent lifting of the mixing bowl if the mixing bowl is not properly aligned in the bowl-handling apparatus.

6. A bowl-handling apparatus for lifting, transporting, and emptying the contents of a mixing bowl comprising:

a frame;

a lift arm having a first end and a second end, said first end pivotally connected to said frame, said lift arm including a first cam follower and a second cam follower;

means connected between said frame and said lift arm for pivoting said lift arm to thereby raise said second end of said lift arm;

a bowl holder, said bowl holder having lateral extending pivot pins for pivotally engaging said lift arm to permit said bowl holder to pivot with respect to said lift arm as said lift arm is raised or lowered;

further means mounted on said bowl holder for securing the ear of a mixing bowl to said bowl holder, said further means including a first guide pin for engaging and guiding a first ear of a mixing bowl onto said first guide pin and a second guide pin for engaging and guiding a second ear of the mixing bowl onto said second guide pin to align and hold said mixing bowl on said U-shaped bowl holder and a first pivotal latch with a first cam for engaging said first cam follower so that when said lift arm is pivoted upward said first cam engages said first cam follower to force said first pivotal latch over the first ear on a mixing bowl located on said bowl holder and a second pivotal latch with a second cam for engaging said second cam follower so that when said lift arm is pivoted upward said second cam engages said second cam follower to force saidsecond pivotal latch over the second ear on a mixing bowl so that the mixing bowl can be locked in said bowl holder; and bowl emptying means connected to said lateral extending pivot pin, said bowl emptying means including a linkage and a shock absorber, said shock absorber connected to said linkage and to said bowl holder to dampen rocking motion of a mixing bowl as a mixing bowl is lifted upward in said frame, said bowl emptying means mounted on said pivot pin to permit a user to rotate said lateral extending pivot pin and said bowl holder to enable a user to empty the contents of the mixing bowl supported in said bowl holder.

7. The bowl-handling apparatus of claim 6 wherein said means includes a rechargeable battery and a linear actuator for pivoting said lift arm.

8. The bowl-handling apparatus of claim 7 including a bowl damper to dampen oscillation of the mixing bowl located on said bowl-handling apparatus.

9. The bowl-handling apparatus of claim 8 wherein said bowl emptying means includes a lever for manually rotating the mixing bowl to a position where the contents can be emptied.

10. The bowl-handling apparatus of claim 9 wherein said further means includes at least two guide members to horizontally restrain the ears of the mixing bowl on said bowl holder.

* * * * *